United States Patent [19]
Hirakawa

[11] Patent Number: 5,724,193
[45] Date of Patent: Mar. 3, 1998

[54] SUPER WIDE ANGLE ZOOM LENS

[75] Inventor: Jun Hirakawa, Tokyo, Japan

[73] Assignee: Asahi Kogaku Kogyo Kabushiki Kaisha, Tokyo, Japan

[21] Appl. No.: 546,960

[22] Filed: Oct. 23, 1995

[30] Foreign Application Priority Data

Oct. 21, 1994 [JP] Japan ................... 6-256977
Aug. 28, 1995 [JP] Japan ................... 7-219238

[51] Int. Cl.$^6$ .................................. G02B 15/14
[52] U.S. Cl. .......................... 359/691; 359/708
[58] Field of Search ........................ 359/690, 691, 359/687, 688, 708

[56] References Cited

U.S. PATENT DOCUMENTS

| | | |
|---|---|---|
| 3,515,462 | 6/1970 | Kazamaki et al. |
| 4,099,846 | 7/1978 | Kawamura et al. ........... 359/708 |
| 4,153,339 | 5/1979 | Tajima et al. ................. 359/708 |
| 4,159,865 | 7/1979 | Kawamura et al. ........... 359/708 |
| 4,196,968 | 4/1980 | Itoh ............................... 359/680 |
| 4,241,981 | 12/1980 | Okudaira . |
| 4,662,723 | 5/1987 | Imai .............................. 359/691 |
| 5,198,931 | 3/1993 | Igarashi ........................ 359/659 |
| 5,329,401 | 7/1994 | Sato .............................. 359/686 |
| 5,329,402 | 7/1994 | Sato .............................. 359/691 |

*Primary Examiner*—Bruce Anderson
*Attorney, Agent, or Firm*—Greenblum & Bernstein P.L.C.

[57] ABSTRACT

A super wide angle zoom lens includes a first lens group of negative power and a rear lens group of positive power, in this order from the object side, so that zooming may be carried out by relatively moving the first lens group and the rear lens group. The zoom lens has, at a wide angle extremity thereof, a half angle of view of more than 60°, which constitutes a half angle of view of a fisheye lens.

17 Claims, 15 Drawing Sheets

EXAMPLE 1 (TABLE 1)
ENP(o) = 2.977
ENP(p) = 13.312

EXAMPLE 1 (TABLE 1)
ENP(o) = 2.977
ENP(p) = 13.312

SUPER WIDE ANGLE ZOOM LENS

BACKGROUND OF THE INVENTION

1. Field of the Invention

The present invention relates to a zoom lens for a single lens reflex camera or the like, and more precisely, the present invention relates to a super wide angle zoom lens which is equivalent to a fisheye lens particularly on the wide angle side.

2. Description of Related Art

In a conventional zoom lens including a super wide angle zoom lens, a lens closest to an object to be photographed is made of an aspherical lens to compensate for distortion in a wide angle of view. However, this results in a large and complex zoom lens. Moreover, a maximum wide angle above 60° cannot be obtained. A fisheye lens is basically used for special purposes (special projection formula), to photograph for the purpose of creating an image having an increasing amount of distortion. The fisheye lens is chiefly used in a scientific or technological field as a measuring or metering system. A recently developed diagonal fisheye lens can also be used for normal photographing, wherein the inherent distortion is positively utilized as a deformation to create an image.

Upon photographing for such a special image creation, it is not necessary to strictly take into account the projection formula. Rather, the projection formula should not be restricted to enhance the freedom to design the lens.

SUMMARY OF THE INVENTION

It is an object of the present invention to provide a super wide angle zoom lens having, at the wide angle extremity, a half angle of view of more than 60°, and which can also reach 80°, which constitutes the field angle range of a fisheye lens, wherein distortion on the wide angle side is positively utilized.

To achieve the object mentioned above, according to the present invention, there is provided a super wide angle zoom lens comprising a first lens group of negative power and a rear lens group of positive power, in this order from the object side, so that power can be varied by relatively moving the first lens group and the rear lens group, wherein the super wide angle zoom lens has, at the wide angle extremity, a half angle of view of more than 60°, to serve as a fisheye lens.

Preferably, the first negative lens group comprises a negative meniscus lens having a concave surface located on the image surface side and satisfies the requirements defined by the following formulae (1) and (2):

(1) $r_a/r_b>5$, (2) $h(w:60)/r_b>0.7$, wherein "$r_a$" stands for the radius of curvature of the surface of the negative meniscus lens that is located on the object side; "$r_b$" the radius of curvature of the surface of the negative meniscus lens that is located on the image side; and, "h(w:60)" the maximum height with respect to the optical axis that a bundle of light, incident at an angle of 60° on the surface nearest to the object side of the first lens group, passes through the image side of the negative meniscus lens (see, e.g., FIG. 25).

Preferably, a super wide angle zoom lens meets the following formula (3):

(3) $0.5<D_w/f_1<1.4$, wherein "$D_w$" stands for the spatial distance between the first lens group and the rear lens group at the wide angle extremity, and "$f_1$" the focal length of the first lens group.

A super wide angle zoom lens also preferably meets the following formula (4):

(4) $r_c<0$, wherein "$r_c$" stands for the radius of curvature of the surface of a lens next to the negative meniscus lens (reckoned from the object side) on the object side. A super wide angle zoom lens also preferably meets the following formula (5):

(5) $0.6<f_w/f_1<1.0$, wherein "$f_w$" stands for the focal length of the whole lens system at the wide angle extremity.

According to another aspect of the present invention, at the wide angle extremity the half angle of view is more than 70°, and the negative meniscus lens meets the following formula (2'):

(2') $h(w:70)/r_b>0.8$, wherein "h(w:70)" stands for the maximum height with respect to the optical axis that a bundle of light, incident at an angle of 70° on the surface nearest to the object side of the first lens group, passes through the image side of the negative meniscus lens.

According to still another aspect of the present invention, at the wide angle extremity the half angle of view is more than 80° and the negative meniscus lens meets the following formula (2"):

(2") $h(w:80)/r_b>0.85$, wherein "h(w:80)" stands for the maximum height with respect to the optical axis that a bundle of light, incident at an angle of 80° on the surface nearest to the object side of the first lens group, passes through the image side of the negative meniscus lens.

According to another embodiment of the present invention, there is provided a super wide angle zoom lens comprising a first lens group of negative power and a rear lens group of positive power, in this order from the object side, so that power can be varied by relatively moving the first lens group and the rear lens group, wherein the position of an entrance pupil at which a bundle of light, having the maximum angle of view at the wide angle extremity, passes; and, the position of an entrance pupil at which paraxial light passes satisfies the following relationship (6):

(6) $(ENP_{(O)}-ENP_{(P)})/f_1>0.3$, $(f_1<0)$ wherein "$ENP_{(O)}$" stands for the distance of the entrance pupil, through which light having the maximum angle of view at the wide angle extremity passes, from the first surface on the object side of the first lens group, and "$ENP_{(P)}$" is the distance of the entrance pupil, through which paraxial light passes at the wide angle extremity, from the first surface on the object side of the first lens group, respectively.

The value of $(ENP_{(O)}-ENP_{(P)})$ refers to the distance between the two entrance pupils mentioned above, and is a negative value.

Also in this embodiment, preferably, the super wide angle zoom lens meets the formulae (3) and (4) rated above.

A diaphragm is provided which is movable together with the rear lens group, independently of the first lens group during the zooming operation.

The present disclosure relates to subject matter contained in Japanese Patent Applications No. 6-256977 (filed on Oct. 21, 1994) and No. 7-219238 (filed on Aug. 28, 1995) which are expressly incorporated herein by reference in their entireties.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
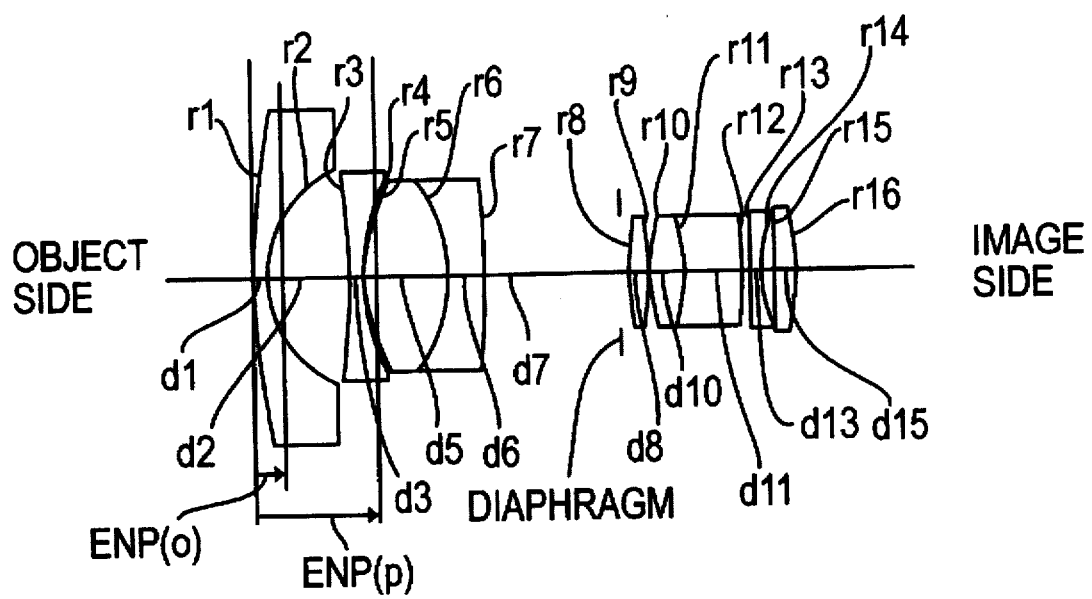
FIG. 1 is a schematic view showing a lens arrangement of a super wide angle zoom lens according to a first embodiment of the present invention.

According to one of the more significant features of the present invention, in a zoom lens including a super wide angle, distortion is not corrected, but rather, a large amount of negative distortion is positively produced by the lens group, on the object side, to increase the angle of view on the wide angle side to reach the angle of view of a fisheye lens.

As mentioned above, if distortion is reduced to increase the angle of view up to a value including a super wide angle, the first lens group will be large and complex. However, if distortion is positively produced, no complicated structure is necessary.

In a lens having an increasing amount of distortion on the wide angle side, if the focal length changes toward the telephoto side by a zooming operation, an adverse influence by the distortion is reduced as the angle of view becomes small, so that a projection system almost identical to that in a common lens can be realized.

A zoom lens according to the present invention is comprised of a first lens group having a negative power, a diaphragm, and a rear lens group having a positive power, arranged in this order from the object side, and has a half angle of view of more than 60° at the wide angle extremity, to serve as a fisheye lens.

The formula (1) specifies the ratio of the radii of curvature of the opposed surfaces of the negative meniscus lens to increase the angle of view. Namely, the first lens group has a negative power strong enough to produce an increasing amount of negative distortion. If the value of "$r_a$" or "$r_b$" is made small or large enough, so that the ratio is below the lower limit defined in formula (1), the negative power of the first lens group is too small to realize a super wide angle.

The formula (2) specifies the height of off-axis light incident upon the surface of radius "$r_b$" of the negative meniscus lens located on the image surface side. Namely, the off-axis light which passes through the surface of the negative meniscus lens, having a radius of "$r_b$" and located on the image surface side at a high position thereof, causes a large amount of distortion to increase the angle of view.

The formula (3) relates to the requirement for zooming. Namely, it specifies the distance between the first lens group and the rear lens group to carry out the zooming. If the ratio is smaller than the lower limit, the distance between the lens groups at the wide angle extremity is so small that the amount of variance in the distance between the lens groups is also small; and, hence, no desirable zoom ratio can be obtained. Conversely, if the ratio is above the upper limit, the distance between the lens groups is so large that it is very difficult for light to reach the rear lens group; and, thus, an insufficient quantity of light at the peripheral portion of the lens will result.

The formula (4) specifies the requirement necessary to make light which enters the strong negative meniscus lens effectively incident upon the rear lens group. Namely, among lenses in the first lens group, the lens located next to the negative meniscus lens from the object side is provided with a divergent surface on the object side, and the incident angle of light incident upon the rear lens group is made small. Consequently, not only can the necessary spatial distance between the first lens group and the rear lens group be obtained, but also the diameter of the rear lens group can be reduced.

The formula (5) relates to the negative power of the first lens group sufficiently required to make the first lens group small enough to thereby miniaturize the whole optical system. If the ratio is below the lower limit, the negative power of the first lens group is so small that the displacement of the first lens group must be considerably increased to obtain a zoom ratio of more than 1.6, thus leading to a large optical system.

Conversely, if the ratio is above the upper limit, the miniaturization of the optical system can be achieved; however, this is accompanied by an increase in the variation in astigmatism upon zooming.

The formula (2') specifies the requirement that light emitted from the negative meniscus lens, belonging to the first lens group, should meet to obtain a half angle of view of more than 70°. Similarly, the formula (2") specifies the requirement that light emitted from the negative meniscus lens, belonging to the first lens group, should meet to obtain the half angle of view of more than 80°. An increased half angle of view can be obtained by off-axis rays that pass through the surface (whose radius of curvature is "$r_b$") of the negative meniscus lens on the image surface side at a high portion thereof and that has an increasing amount of distortion.

The formula (6) specifies the requirement to effectively receive off-axis rays at the wide angle extremity. Namely, the position of the entrance pupil is moved toward the object side, in accordance with an increase of the angle of view, so as to receive a bundle of light having a large angle of view and thereby realize the characteristics of a fisheye lens. If the ratio in formula (6) is below the lower limit, it is impossible to receive a bundle of light whose angle of view is large enough to serve as a fisheye lens.

The diaphragm of the super wide angle zoom lens, according to the present invention, is moved independently of the first lens group so that the entrance pupil can be moved upon zooming. To this end, the diaphragm is preferably moved together with the rear lens group to simplify the structure.

Several numerical examples (embodiments) of a super wide angle zoom lens according to the present invention will be discussed below.

EMBODIMENT 1

FIG. 1 shows a first embodiment of a lens arrangement of a super wide angle zoom lens. In FIG. 1, the zoom lens is comprised of a first lens group of negative power, a diaphragm, and a rear lens group of positive power, arranged in this order from the object side. The first lens group is comprised of four lenses (two of which are cemented) that are moved together. In the first lens group, the lens located nearest to the object is a negative mensicus lens, which satisfies formula (1). The rear lens group is comprised of five lenses (two of which are cemented) that are moved together. The diaphragm is movable together with the rear lens group, independently of the first lens group.

Figure 2:
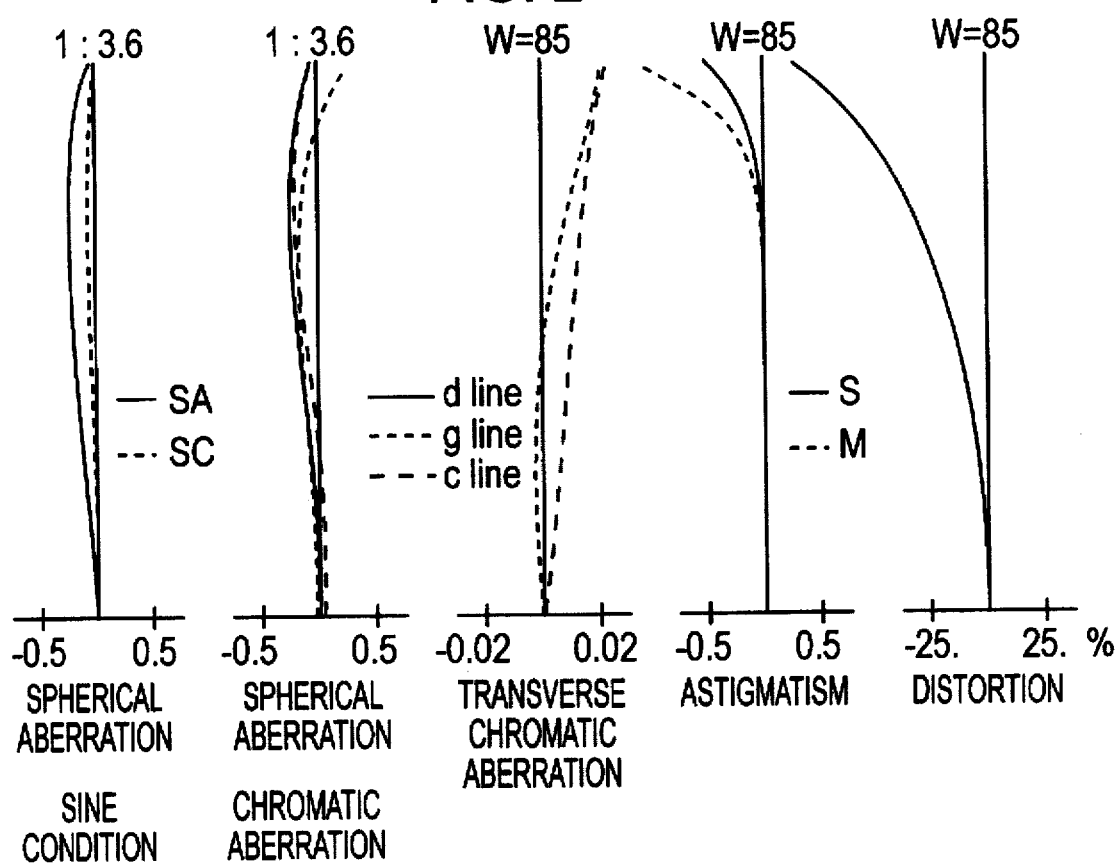
FIG. 2 shows diagrams of various aberrations of the lens system shown in FIG. 1, at a wide angle extremity.
Figure 3:
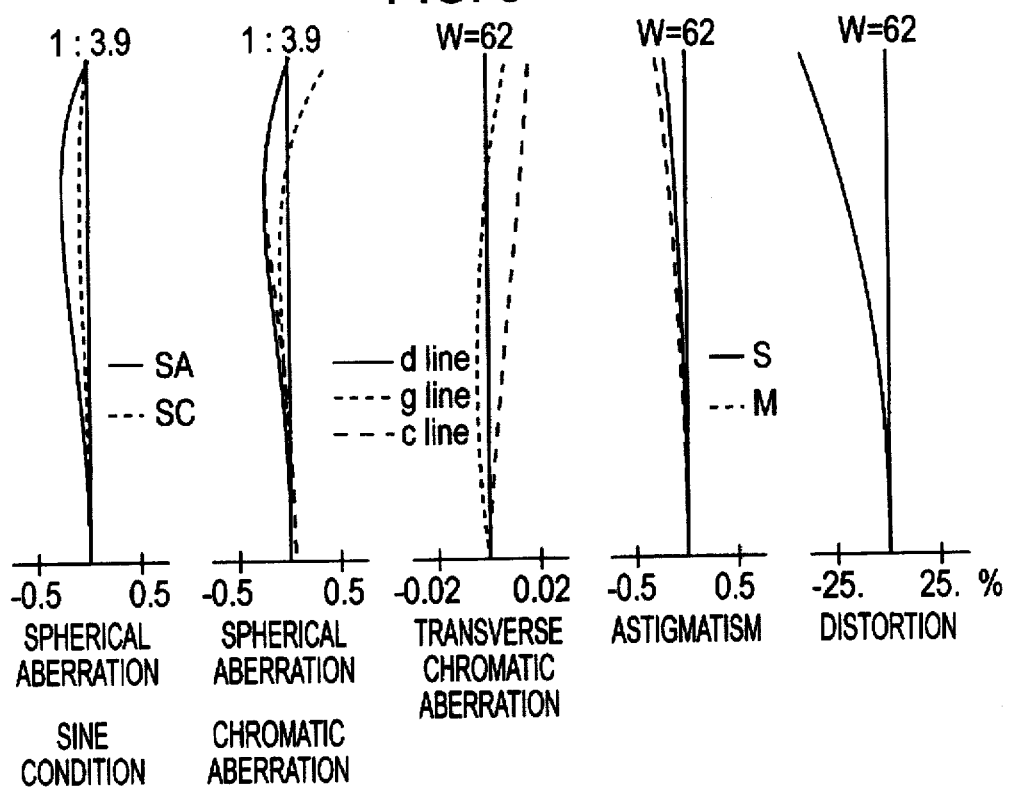
FIG. 3 shows diagrams of various aberrations of the lens system shown in FIG. 1, at an intermediate focal length.
Figure 4:
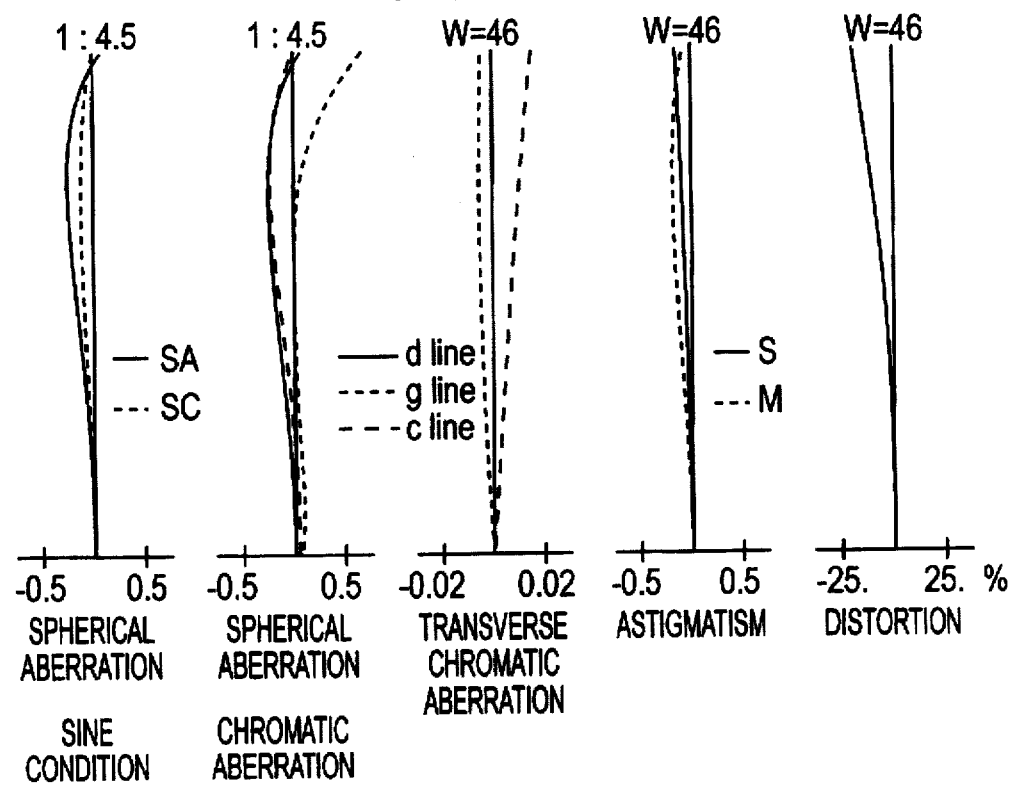
FIG. 4 shows diagrams of various aberrations of the lens system shown in FIG. 1, at a telephoto extremity.

Numerical data of the lens system is shown in Table 1 below. Aberrations at the wide angle extremity, an intermediate focal length, and the telephoto extremity are shown in FIGS. 2, 3 and 4, respectively.

In the drawings and tables below, "SA" designates the spherical aberration; "SC" the sine condition; "d-line", "g-line" and "C-line" the chromatic aberrations represented by the spherical aberrations, and the lateral chromatic aberrations, at the respective wavelengths; and "S" and "M" the sagittal ray and meridional ray, respectively. Furthermore "$F_{NO}$" designates the F-number; "f" the focal length; "W" the half angle of view; "$f_B$" the back focal distance; "r" the radius of curvature of each lens surface; "d" the lens thickness or the distance between the lenses; "N" the refractive index of the d-line; and "$v_d$" the Abbe number of the d-line, respectively.

TABLE 1

| $F_{NO}$ = 3.6–3.9–4.5 |
| :-: |
| f = 16.79–20.64–27.00 |
| W = 85–62–46° |
| $f_B$ = 40.13–45.42–54.16 |

| surface No. | r | d | $N_d$ | $v_d$ |
|---|---|---|---|---|
| 1 | 114.300 | 1.50 | 1.77250 | 49.6 |
| 2 | 13.800 | 9.86 | — | — |
| 3 | –60.900 | 1.50 | 1.80400 | 46.6 |
| 4 | 29.592 | 0.10 | — | — |
| 5 | 23.707 | 9.98 | 1.74950 | 35.3 |
| 6 | –17.287 | 4.22 | 1.80610 | 40.9 |
| 7 | –87.167 | 17.38–10.88–4.20 | — | — |
| 8 | 54.300 | 2.45 | 1.64769 | 33.8 |
| 9 | –54.300 | 0.10 | — | — |
| 10 | 22.910 | 4.48 | 1.48749 | 70.2 |
| 11 | –18.810 | 6.54 | 1.83400 | 37.2 |
| 12 | –43.621 | 0.96 | — | — |
| 13 | 666.343 | 1.50 | 1.80518 | 25.4 |
| 14 | 22.339 | 1.40 | — | — |
| 15 | 520.629 | 2.77 | 1.65160 | 58.5 |
| 16 | –27.090 | — | — | — |

$r_a$ = 114.300  $r_b$ = 13.800  $r_c$ = –60.900
h(w:80) = 12.22  h(w:70) = 11.94  h(w:60) = 11.46
$D_W$ = 17.38  $f_1$ = –20.636  $f_W$ = 16.79
$ENP_{(O)}$ = 2.977  $ENP_{(P)}$ = 13.312

EMBODIMENT 2

Figure 5:
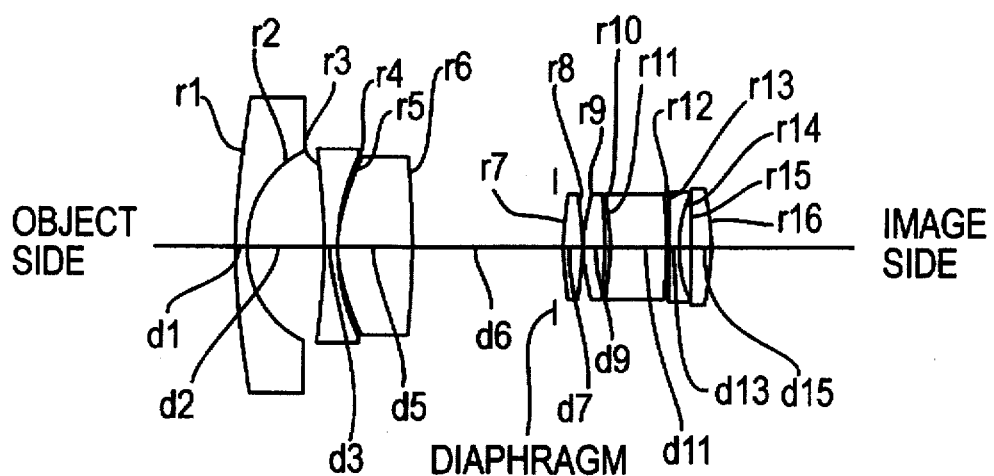
FIG. 5 is a schematic view showing a lens arrangement of a super wide angle zoom lens according to a second embodiment of the present invention.

FIG. 5 shows a second embodiment of a lens arrangement of a super wide angle zoom lens. In FIG. 5, the zoom lens is comprised of a first lens group of negative power, a diaphragm, and a rear lens group of positive power, arranged in this order from the object side. The first lens group is comprised of three lenses that are moved together. In the first lens group, the lens located nearest to the object is a negative meniscus lens, which satisfies formula (1). The rear lens group is comprised of five lenses that are integrally moved. The diaphragm is movable together with the rear lens group, independently of the first lens group.

Figure 6:
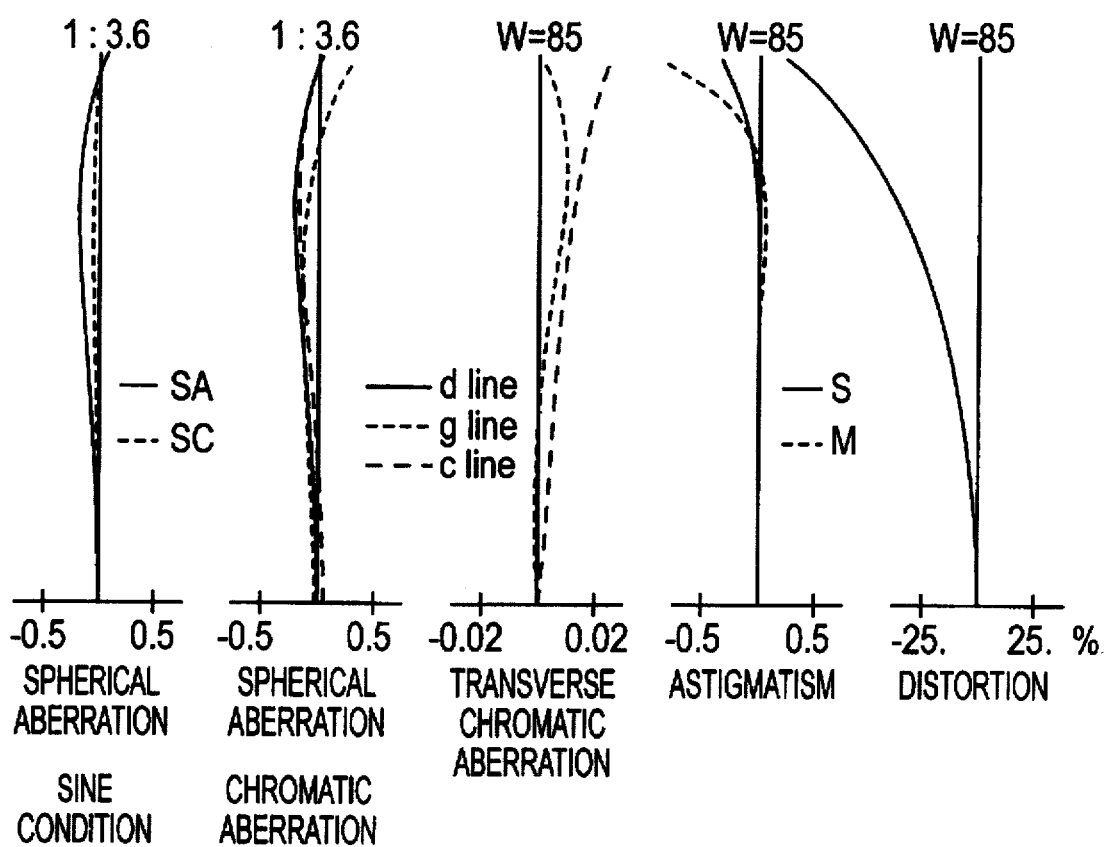
FIG. 6 shows diagrams of various aberrations of the lens system shown in FIG. 5, at a wide angle extremity.
Figure 7:
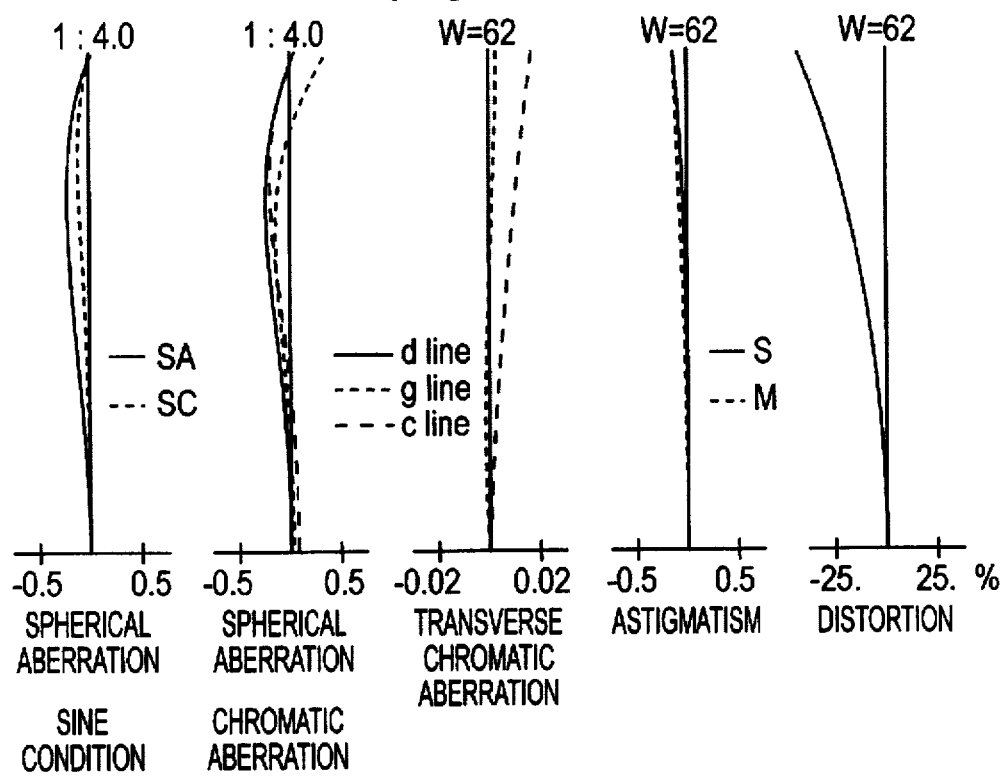
FIG. 7 shows diagrams of various aberrations of the lens system shown in FIG. 5, at an intermediate focal length.
Figure 8:
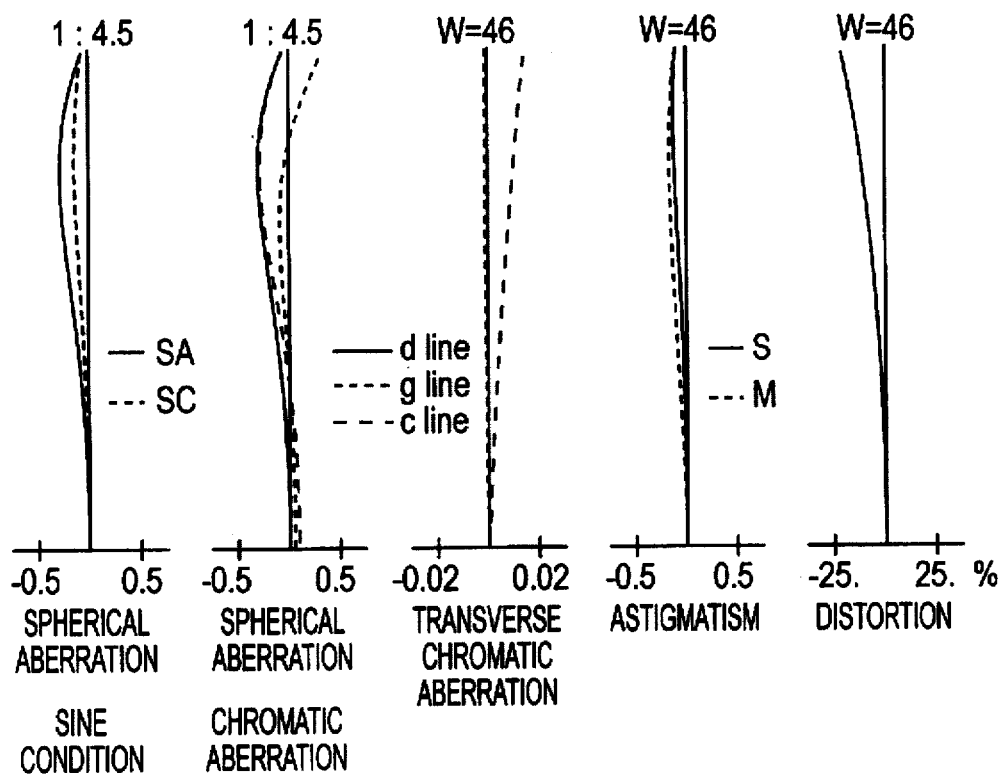
FIG. 8 shows diagrams of various aberrations of the lens system shown in FIG. 5, at a telephoto extremity.

Numerical data of the lens system is shown in Table 2 below. Aberrations at the wide angle extremity, an intermediate focal length, and the telephoto extremity are shown in FIGS. 6, 7 and 8, respectively.

TABLE 2

| $F_{NO}$ = 3.6–4.0–4.7 |
| :-: |
| f = 16.78–20.64–27.00 |
| W = 85–62–46° |
| $f_B$ = 40.49–45.54–53.89 |

| surface No. | r | d | $N_d$ | $v_d$ |
|---|---|---|---|---|
| 1 | 130.067 | 1.50 | 1.77250 | 49.6 |
| 2 | 13.724 | 9.16 | — | — |

TABLE 2-continued $F_{NO} = 3.6\text{--}4.0\text{--}4.7$
$f = 16.78\text{--}20.64\text{--}27.00$
$W = 85\text{--}62\text{--}46°$
$f_B = 40.49\text{--}45.54\text{--}53.89$

| surface No. | r | d | $N_d$ | $v_d$ |
|---|---|---|---|---|
| 3 | −76.652 | 1.50 | 1.80400 | 46.6 |
| 4 | 28.591 | 0.10 | — | — |
| 5 | 22.385 | 10.20 | 1.71736 | 29.5 |
| 6 | −112.571 | 18.73–12.17–5.43 | — | — |
| 7 | 87.421 | 2.19 | 1.64769 | 33.8 |
| 8 | −51.177 | 0.10 | — | — |
| 9 | 18.890 | 3.24 | 1.48749 | 70.2 |
| 10 | −42.356 | 0.55 | — | — |
| 11 | −24.801 | 6.75 | 1.83400 | 37.2 |
| 12 | −38.928 | 0.20 | — | — |
| 13 | −518.306 | 1.50 | 1.80518 | 25.4 |
| 14 | 21.727 | 1.42 | — | — |
| 15 | 165.986 | 2.77 | 1.65160 | 58.5 |
| 16 | −24.258 | — | — | — |

$r_a = 130.067$  $r_b = 13.724$  $r_c = -76.625$
$h(w{:}80) = 12.00$  $h(w{:}70) = 11.94$  $h(w{:}60) = 11.52$
$D_W = 18.73$  $f_1 = -21.216$  $f_W = 16.78$
$ENP_{(O)} = 2.779$  $ENP_{(P)} = 13.179$

EMBODIMENT 3

Figure 9:
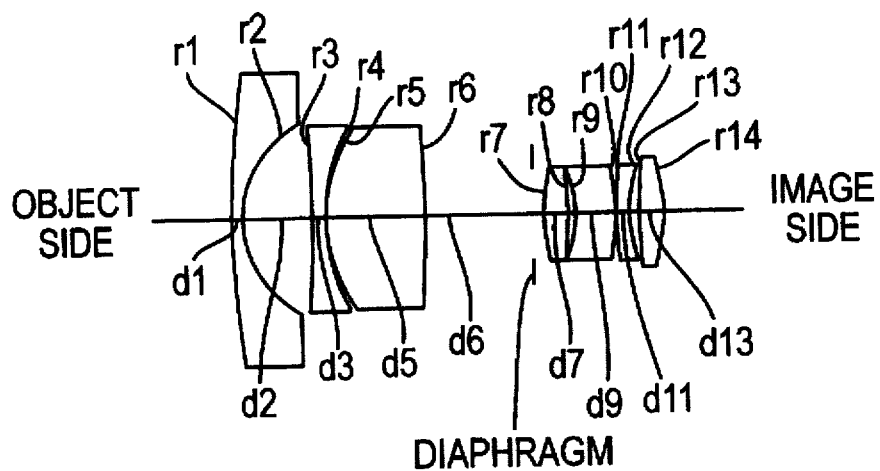
FIG. 9 is a schematic view showing a lens arrangement of a super wide angle zoom lens according to a third embodiment of the present invention.

FIG. 9 shows a third embodiment of a lens arrangement of a super wide angle zoom lens. In FIG. 9, the zoom lens is comprised of a first lens group of negative power, a diaphragm, and a rear lens group of positive power, arranged in this order from the object side. The first lens group is comprised of three lenses that are moved together. In the first lens group, the lens located nearest to the object is a negative meniscus lens, which satisfies formula (1). The rear lens group is comprised of four lenses that are integrally moved. The diaphragm is movable together with the rear lens group, independently of the first lens group.

Figure 10:
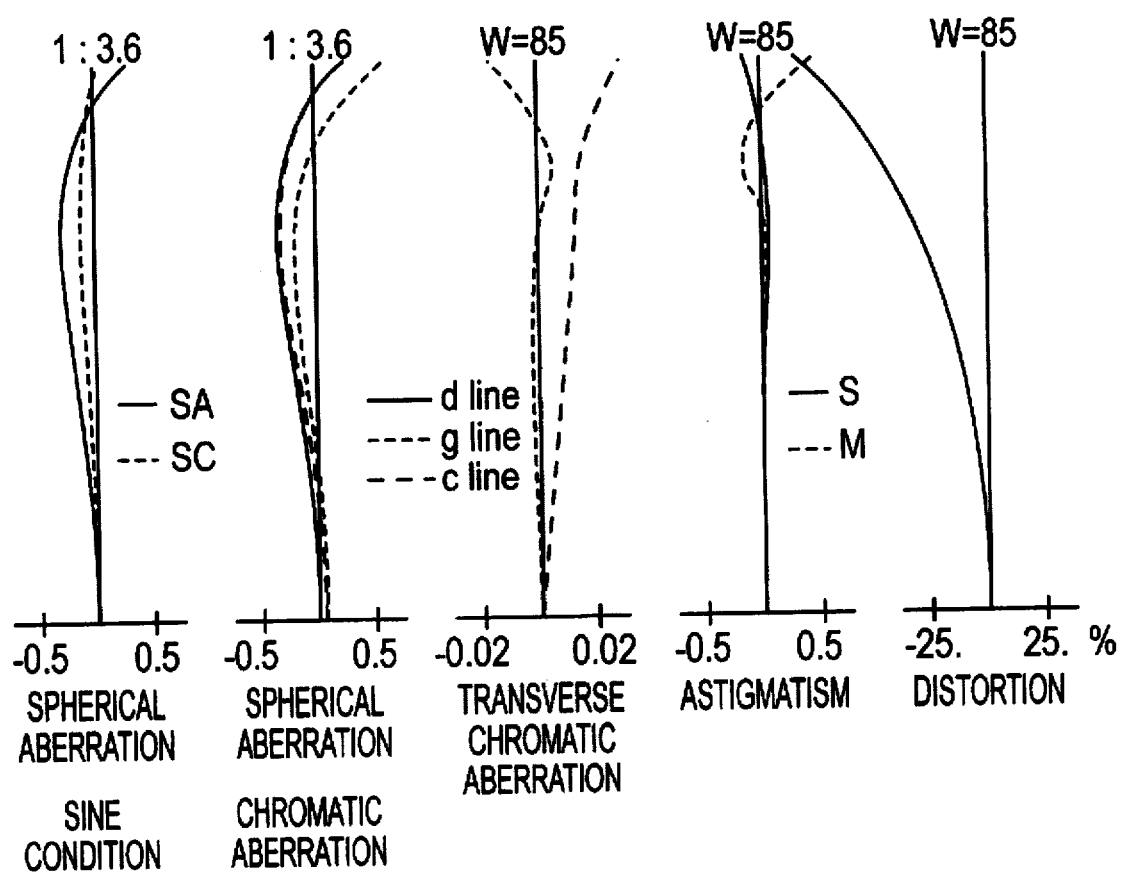
FIG. 10 shows diagrams of various aberrations of the lens system shown in FIG. 9, at a wide angle extremity.
Figure 11:
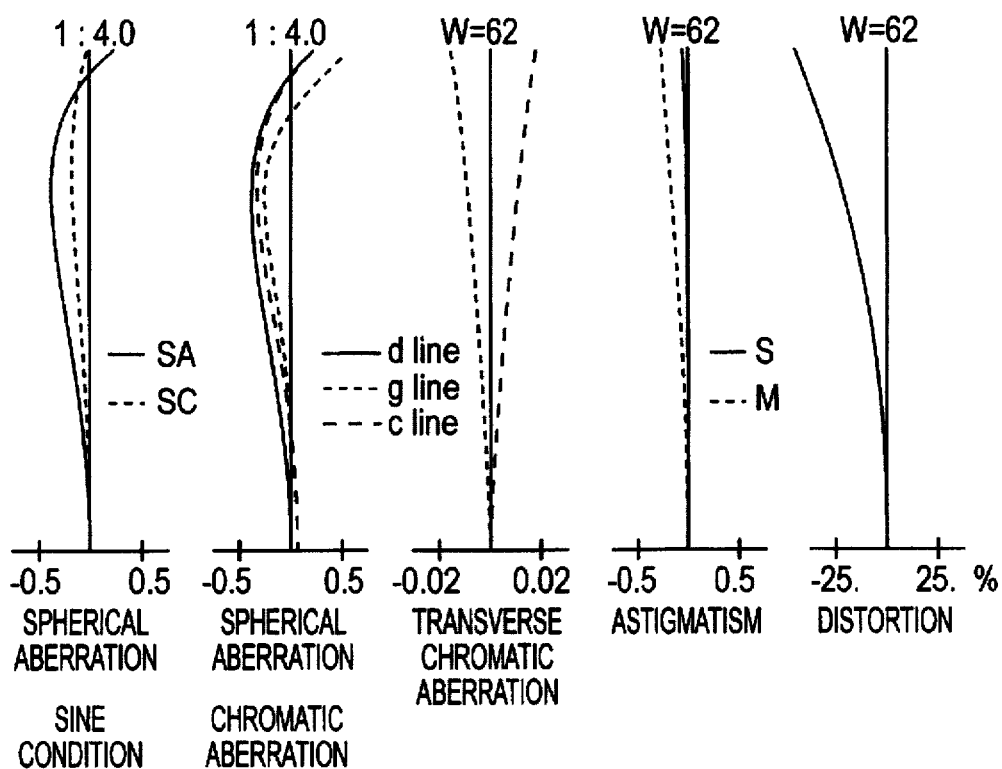
FIG. 11 shows diagrams of various aberrations of the lens system shown in FIG. 9, at an intermediate focal length.
Figure 12:
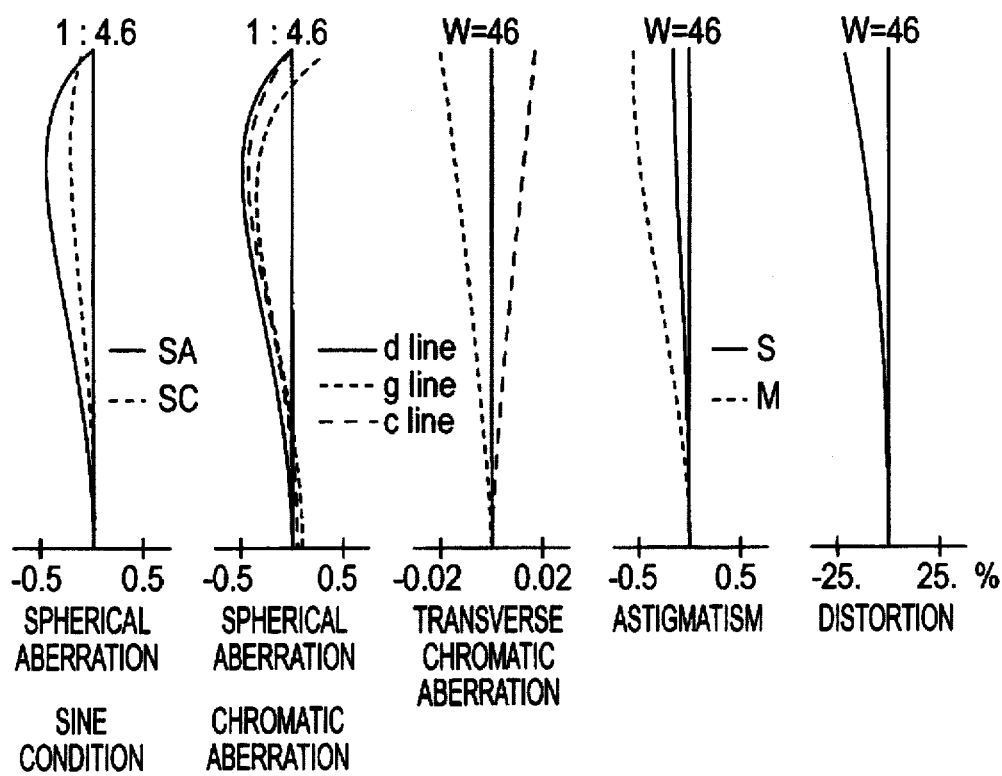
FIG. 12 shows diagrams of various aberrations of the lens system shown in FIG. 9, at a telephoto extremity.

Numerical data of the lens system is shown in Table 3 below. Aberrations at the wide angle extremity, an intermediate focal length, and the telephoto extremity are shown in FIGS. 10, 11 and 12, respectively.

TABLE 3

$F_{NO} = 3.6\text{--}4.0\text{--}4.6$
$f = 16.79\text{--}20.64\text{--}27.00$
$W = 85\text{--}62\text{--}46°$
$f_B = 41.26\text{--}46.03\text{--}53.91$

| surface No. | r | d | $N_d$ | $v_d$ |
|---|---|---|---|---|
| 1 | 119.209 | 1.50 | 1.77250 | 49.6 |
| 2 | 13.836 | 8.59 | — | — |
| 3 | −118.743 | 1.50 | 1.80400 | 46.6 |
| 4 | 24.504 | 0.10 | — | — |
| 5 | 20.267 | 12.19 | 1.75520 | 27.5 |
| 6 | −297.354 | 15.11–8.90–2.51 | — | — |
| 7 | 20.942 | 3.16 | 1.69680 | 55.5 |
| 8 | −35.434 | 0.91 | — | — |
| 9 | −16.512 | 4.86 | 1.83400 | 37.2 |
| 10 | −24.991 | 0.41 | — | — |
| 11 | 106.058 | 1.50 | 1.80518 | 25.4 |
| 12 | 20.581 | 1.26 | — | — |
| 13 | 67.502 | 3.50 | 1.60311 | 60.7 |
| 14 | −22.784 | — | — | — |

$r_a = 119.209$  $r_b = 13.836$  $r_c = -118.743$
$h(w{:}80) = 12.07$  $h(w{:}70) = 11.99$  $h(w{:}60) = 11.64$
$D_W = 15.11$  $f_1 = -21.25$  $f_W = 16.79$
$ENP_{(O)} = 3.033$  $ENP_{(P)} = 13.010$

EMBODIMENT 4

Figure 13:
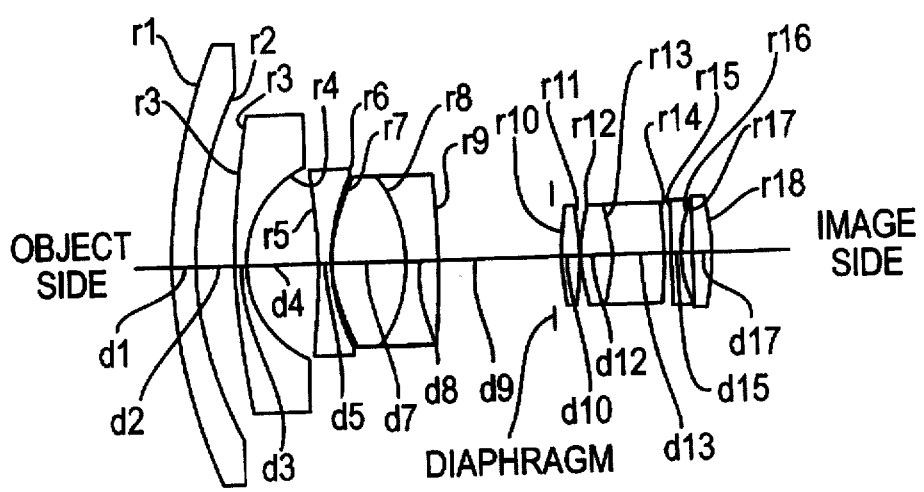
FIG. 13 is a schematic view showing a lens arrangement of a super wide angle zoom lens according to a fourth embodiment of the present invention.

FIG. 13 shows a fourth embodiment of a lens arrangement of a super wide angle zoom lens. In FIG. 13, the zoom lens is comprised of a first lens group of negative power, a diaphragm, and a rear lens group of positive power, arranged in this order from the object side. The first lens group is comprised of five lenses (two of which are cemented) that are moved together. In the first lens group, the second lens located from the object is a negative meniscus lens, which satisfies formula (1). The rear lens group is comprised of five lenses (two of which are cemented) that are integrally moved. The diaphragm is movable together with the rear lens group, independently of the first lens group.

Figure 14:
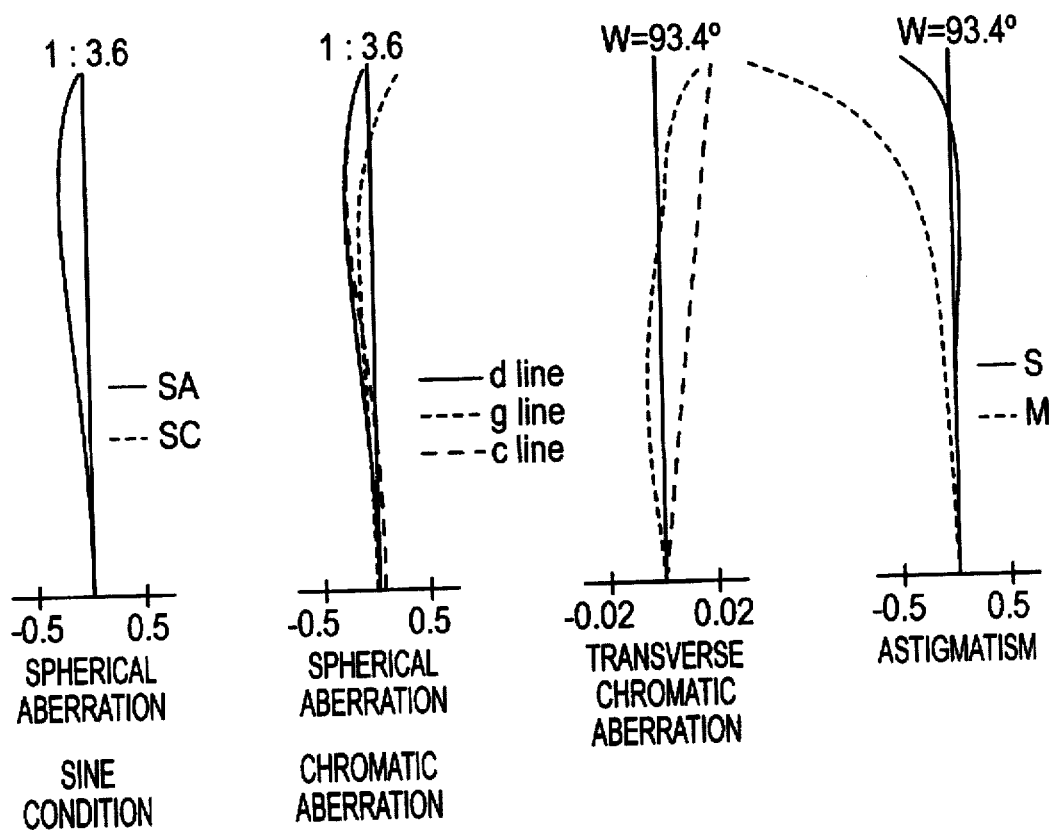
FIG. 14 shows diagrams of various aberrations of the lens system shown in FIG. 13, at a wide angle extremity.
Figure 15:
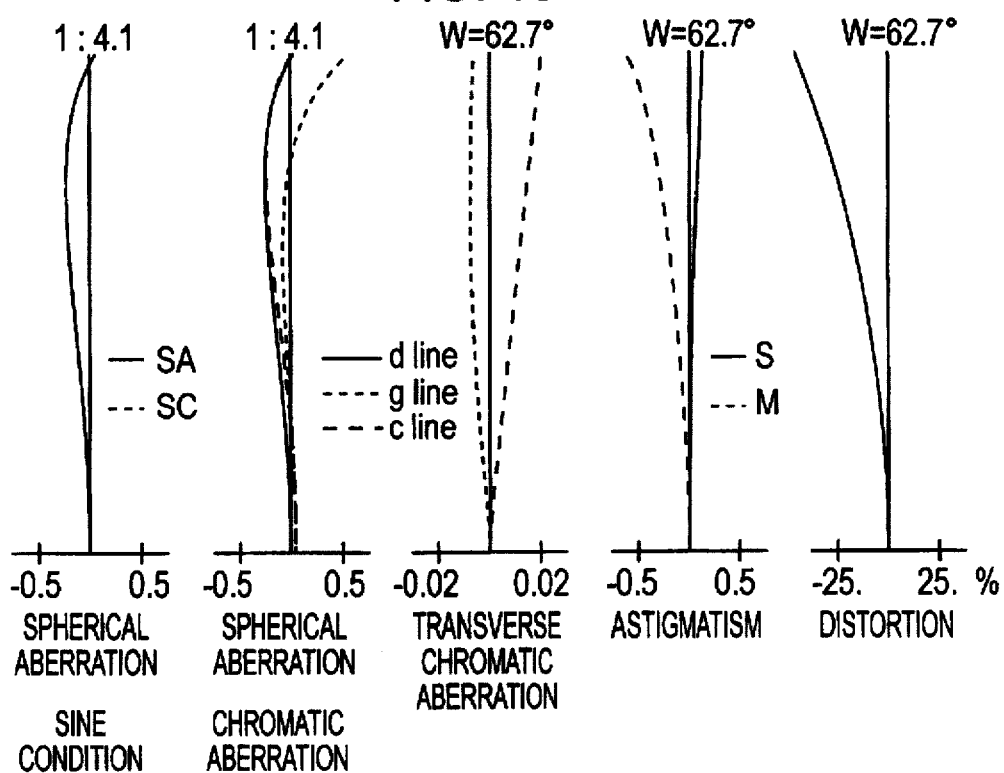
FIG. 15 shows diagrams of various aberrations of the lens system shown in FIG. 13, at an intermediate focal length.
Figure 16:
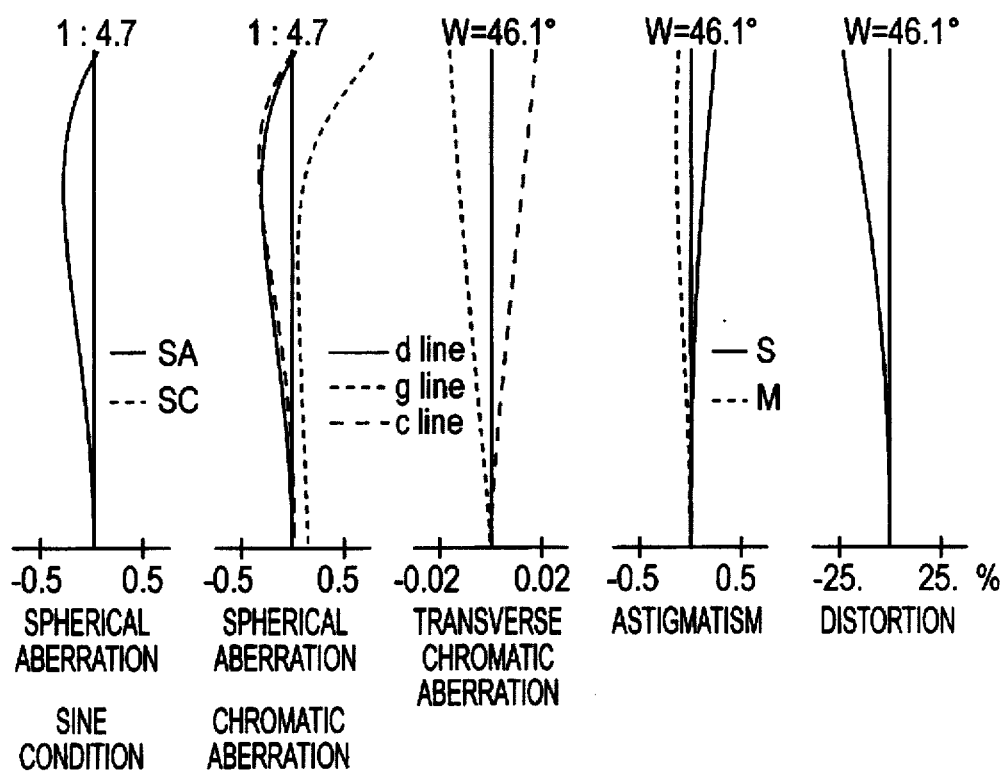
FIG. 16 shows diagrams of various aberrations of the lens system shown in FIG. 13, at a telephoto extremity.

Numerical data of the lens system is shown in Table 4 below. Aberrations at the wide angle extremity, an intermediate focal length, and the telephoto extremity are shown in FIGS. 14, 15 and 16, respectively.

TABLE 4

$F_{NO} = 3.6\text{--}4.1\text{--}4.7$
$f = 16.18\text{--}20.64\text{--}27.00$
$W = 93.4\text{--}62.7\text{--}46.1°$
$f_B = 41.15\text{--}47.77\text{--}57.24$

| surface No. | r | d | $N_d$ | $v_d$ |
|---|---|---|---|---|
| 1 | 80.000 | 3.00 | 1.51633 | 64.1 |
| 2 | 50.000 | 5.00 | — | — |
| 3 | 114.300 | 1.50 | 1.77250 | 49.6 |
| 4 | 13.800 | 9.86 | — | — |
| 5 | −60.900 | 1.50 | 1.80400 | 46.6 |
| 6 | 29.592 | 0.10 | — | — |
| 7 | 23.707 | 9.98 | 1.74950 | 35.3 |
| 8 | −17.287 | 4.22 | 1.80610 | 40.9 |
| 9 | −87.167 | 17.38–10.18–4.01 | — | — |
| 10 | 54.300 | 2.45 | 1.64769 | 33.8 |
| 11 | −54.300 | 0.10 | — | — |
| 12 | 22.910 | 4.48 | 1.48749 | 70.2 |
| 13 | −18.810 | 6.54 | 1.83400 | 37.2 |
| 14 | −43.621 | 0.96 | — | — |
| 15 | 666.343 | 1.50 | 1.80518 | 25.4 |
| 16 | 22.339 | 1.40 | — | — |
| 17 | 520.629 | 2.77 | 1.65160 | 58.5 |
| 18 | −27.090 | — | — | — |

$r_a = 114.300$  $r_b = 13.800$  $r_c = -60.900$
$h(w{:}80) = 12.03$  $h(w{:}70) = 11.68$  $h(w{:}60) = 11.17$
$D_W = 17.38$  $f_1 = -19.055$  $f_W = 16.18$
$ENP_{(O)} = 2.464$  $ENP_{(P)} = 17.721$

EMBODIMENT 5

Figure 17:
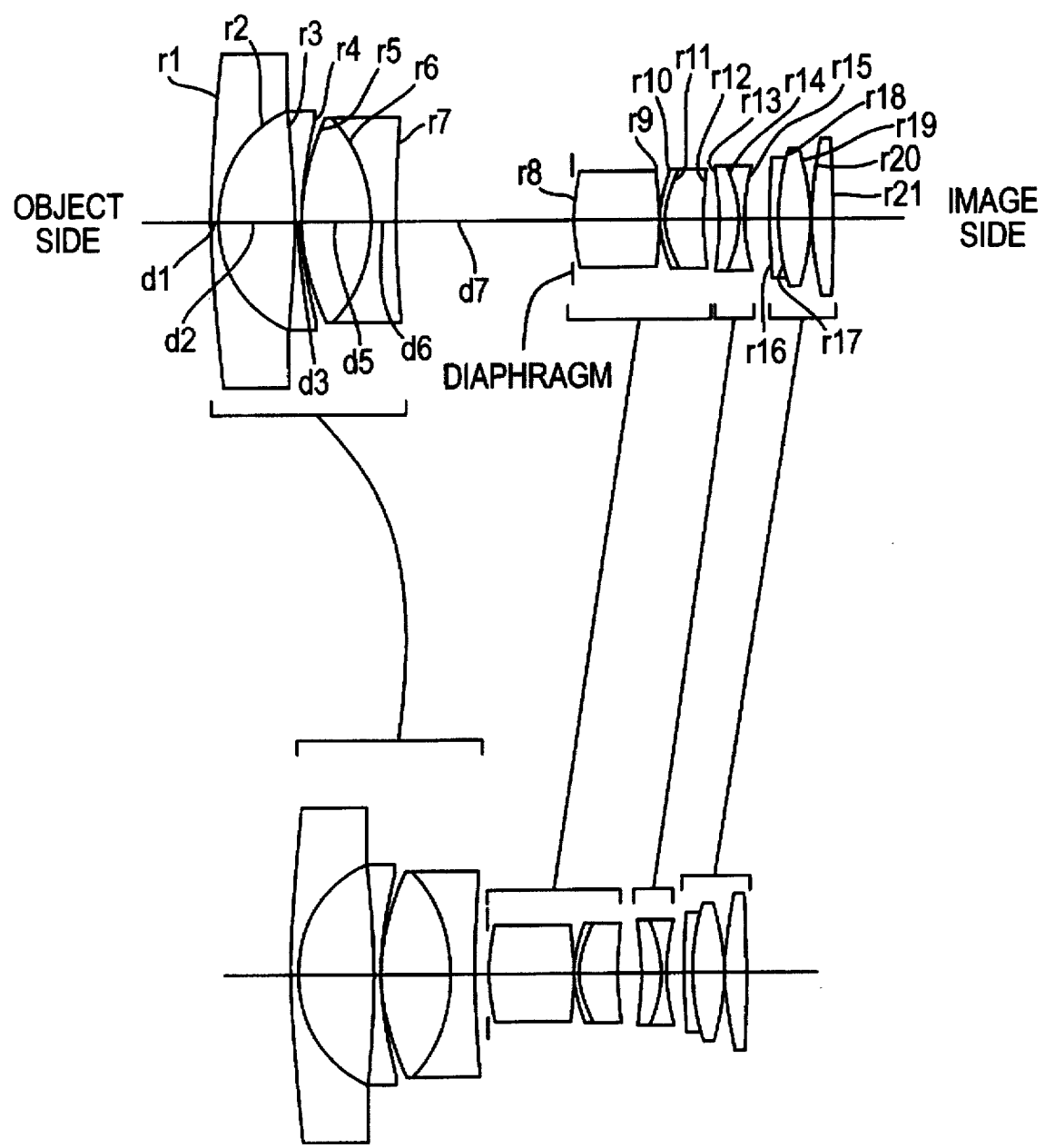
FIG. 17 is a schematic view showing a lens arrangement of a super wide angle zoom lens at a telephoto extremity and a wide angle extremity, and loci of the lenses during the zooming operation, according to a fifth embodiment of the present invention.

FIG. 17 shows a fifth embodiment of a lens arrangement of a super wide angle zoom lens. In FIG. 17, the zoom lens is comprised of a first lens group of negative power, a diaphragm, and a rear lens group of positive power, arranged in this order from the object side. The first lens group is comprised of four lenses (two of which are cemented) that are moved together. In the first lens group, the lens located nearest to the object is a negative meniscus lens, which satisfies formula (1). The rear lens group is comprised of, in order from the object side, a first sub-group (three lenses) having positive power, a second sub-group (two lenses) having negative power, and a third sub-group (three lenses) having positive power. The lenses of each sub-group are movable together. The upper half and lower half of FIG. 17 show the arrangement at the wide angle extremity and the telephoto extremity, respectively. The loci of the movement of the first lens group and the first, second, and third sub-groups at the rear lens group are also shown in FIG. 17.

Figure 18:
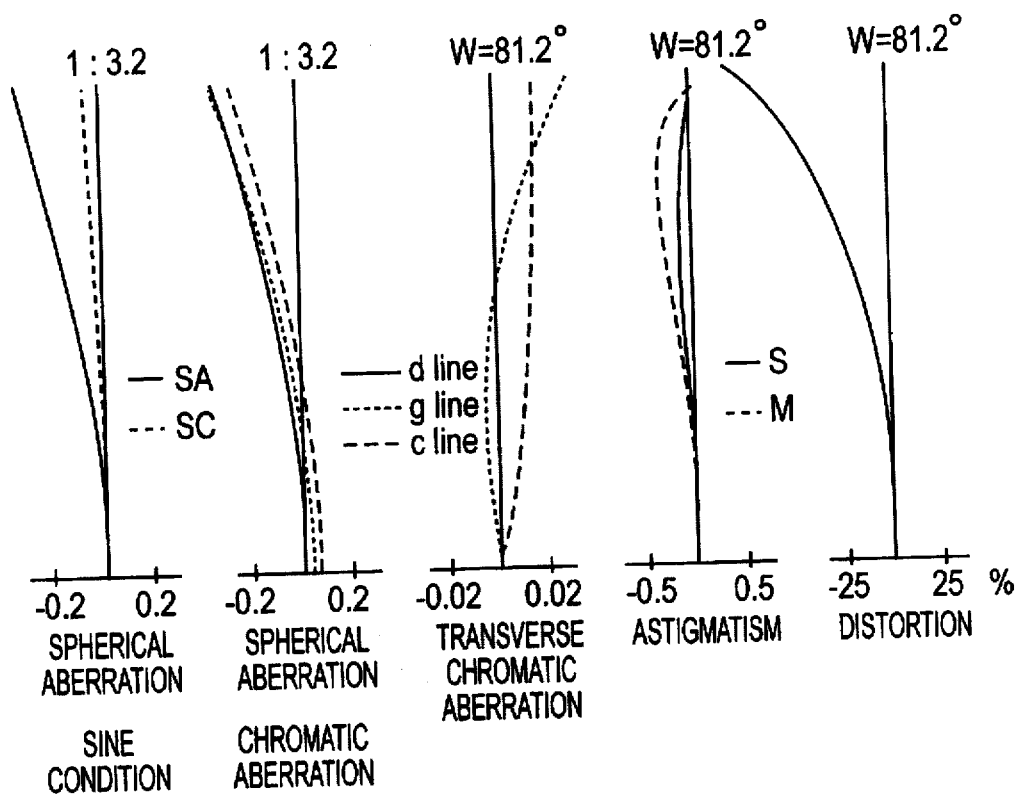
FIG. 18 shows diagrams of various aberrations of the lens system shown in FIG. 17, at a wide angle extremity.
Figure 19:
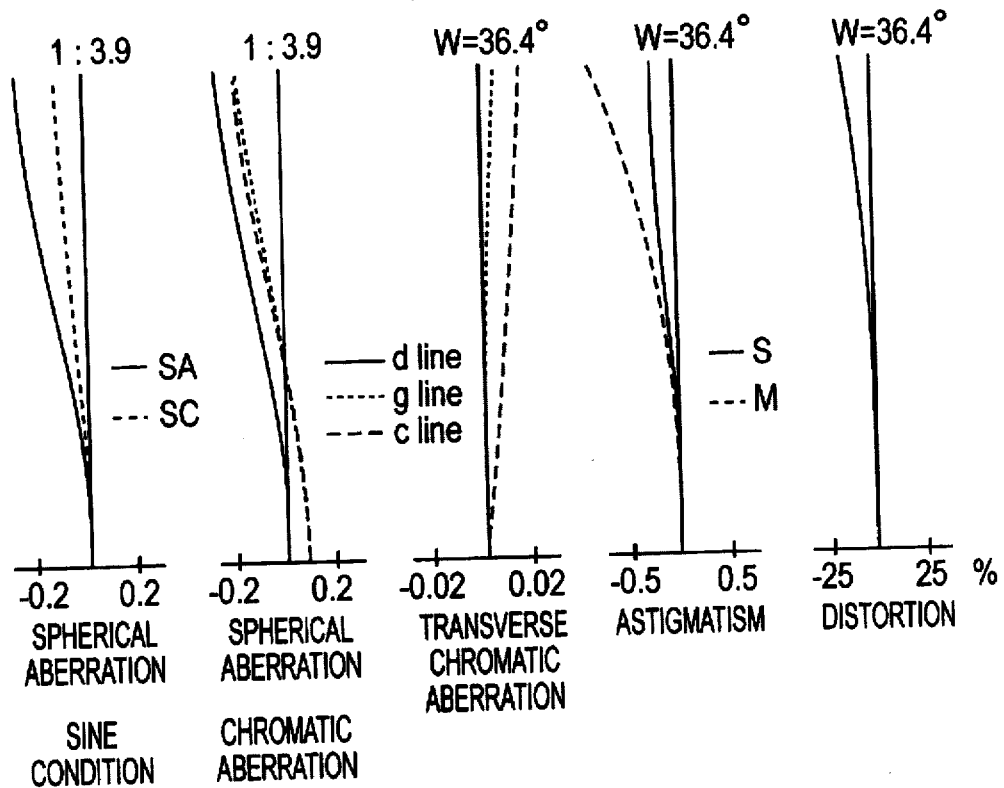
FIG. 19 shows diagrams of various aberrations of the lens system shown in FIG. 17, at an intermediate focal length.
Figure 20:
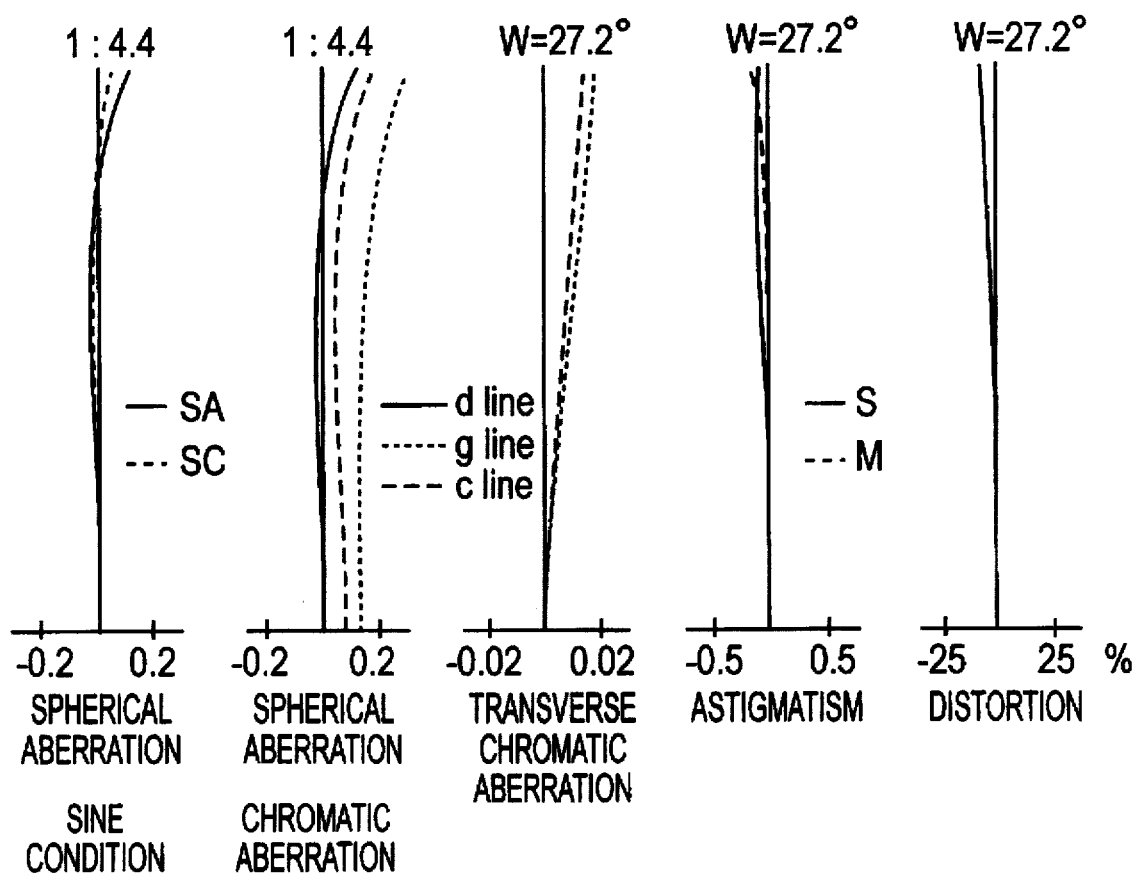
FIG. 20 shows diagrams of various aberrations of the lens system shown in FIG. 17, at a telephoto extremity.

Numerical data of the lens system is shown in Table 5 below. Aberrations at the wide angle extremity, an intermediate focal length, and the telephoto extremity are shown in FIGS. 18, 19 and 20, respectively.

TABLE 5

$F_{NO} = 3.2$–$3.9$–$4.4$
$f = 19.90$–$35.00$–$46.00$
$W = 81.2$–$36.4$–$27.2°$

| surface No. | r | d | $N_d$ | $v_d$ |
|---|---|---|---|---|
| 1 | 363.985 | 1.40 | 1.64630 | 58.3 |
| 2 | 25.341 | 15.35 | — | — |
| 3 | −160.894 | 1.40 | 1.72122 | 37.9 |
| 4 | 87.206 | 0.10 | — | — |
| 5 | 48.889 | 14.25 | 1.73542 | 27.5 |
| 6 | −30.658 | 5.12 | 1.85000 | 37.1 |
| 7 | 175.522 | 37.81–10.89–2.76 | — | — |
| 8 | 52.507 | 18.02 | 1.61800 | 63.4 |
| 9 | −58.536 | 0.10 | — | — |
| 10 | 29.688 | 1.10 | 1.80518 | 25.4 |
| 11 | 19.957 | 7.77 | 1.69680 | 56.5 |
| 12 | 81.214 | 3.15–4.13–4.82 | — | — |
| 13 | −62.474 | 3.90 | 1.80518 | 25.4 |
| 14 | −24.313 | 1.10 | 1.83400 | 37.2 |
| 15 | 40.941 | 5.28–4.31–3.61 | — | — |
| 16 | 292.055 | 1.20 | 1.81000 | 25.4 |
| 17 | 55.659 | 0.47 | — | — |
| 18 | 59.070 | 6.70 | 1.48749 | 70.2 |
| 19 | −41.190 | 0.10 | — | — |
| 20 | 73.951 | 4.48 | 1.80400 | 46.6 |
| 21 | −187.043 | — | — | — |

$r_a = 363.985$  $r_b = 25.341$  $r_c = -160.894$
$h(w{:}80) = 22.47$  $h(w{:}70) = 21.96$  $h(w{:}60) = 20.94$
$D_W = 37.81$  $f_1 = -29.361$  $f_W = 19.90$
$ENP_{(O)} = 6.492$  $ENP_{(P)} = 25.452$

EMBODIMENT 6

Figure 21:
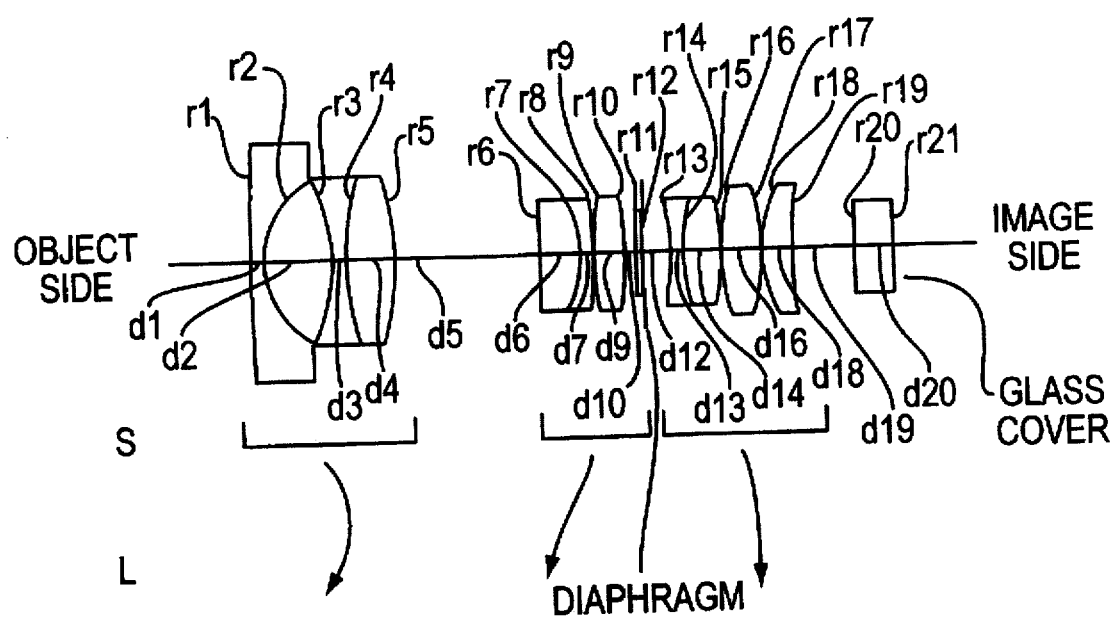
FIG. 21 is a schematic view showing a lens arrangement of a super wide angle zoom lens according to a sixth embodiment of the present invention.

FIG. 21 shows a sixth embodiment of a lens arrangement of a super wide angle zoom lens. In FIG. 21, the zoom lens is comprised of a first lens group of negative power, a diaphragm, and a rear lens group of positive power, arranged in this order from the object side. The first lens group is comprised of three lenses (two of which are cemented) that are moved together. In the first lens group, the lens located nearest to the object is a negative meniscus lens, which satisfies formula (1). The rear lens group is comprised of, in order from the object side, a first sub-group (four lenses) having positive power, which is moved together during the zooming and a second immovable sub-group (four lenses) having positive power. The diaphragm is included in the second sub-group, so that when the first sub-group is moved, a relative movement of the diaphragm with respect to the first lens group occurs. The sixth embodiment is applied to a CCTV (monitoring camera), wherein the last two surfaces are surfaces of a glass cover for the CCD. The loci of the movement of the first lens group and the first and second sub-groups are also shown in FIG. 21. "S" and "L" designate the wide angle extremity and the telephoto extremity, respectively.

Figure 22:
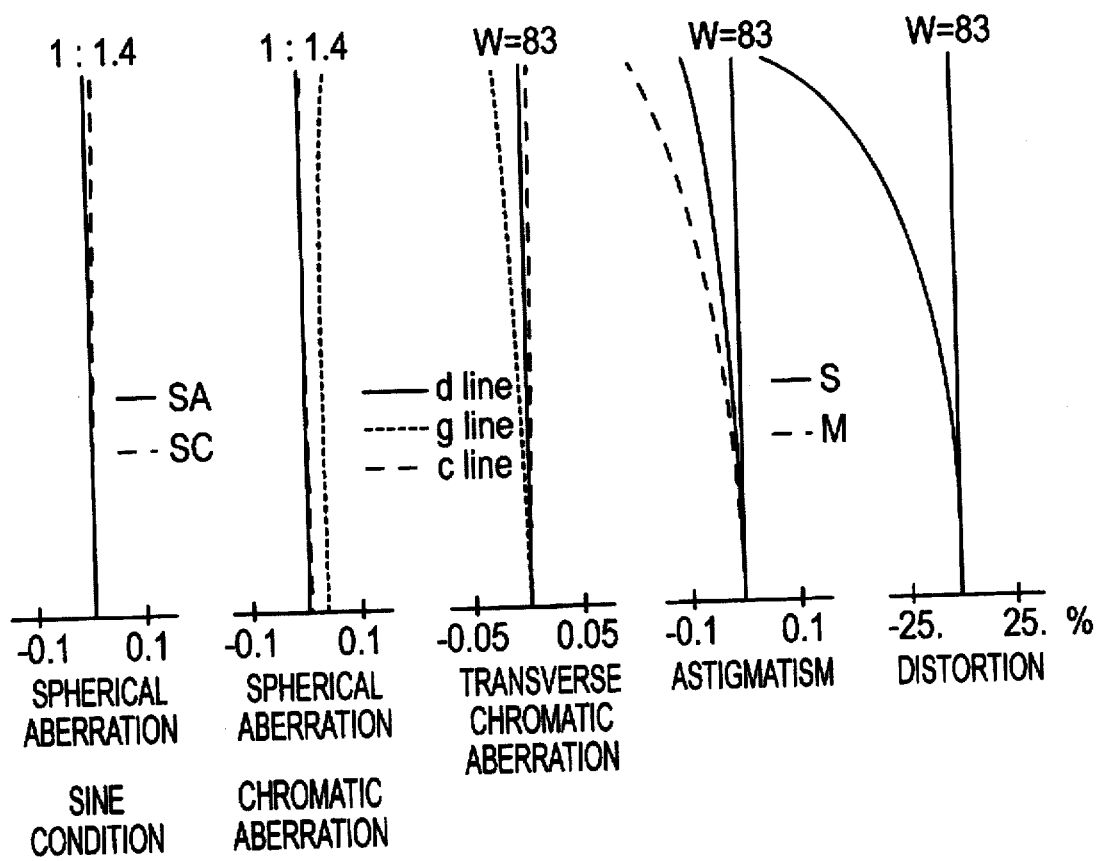
FIG. 22 shows diagrams of various aberrations of the lens system shown in FIG. 21, at a wide angle extremity.
Figure 23:
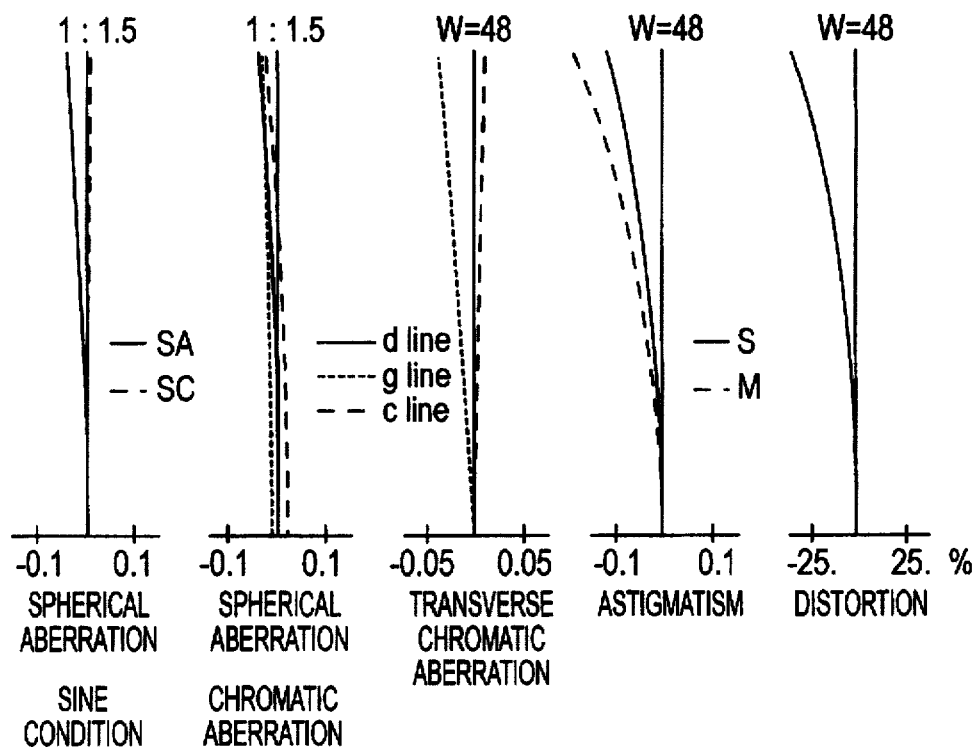
FIG. 23 shows diagrams of various aberrations of the lens system shown in FIG. 21, at an intermediate focal length.
Figure 24:
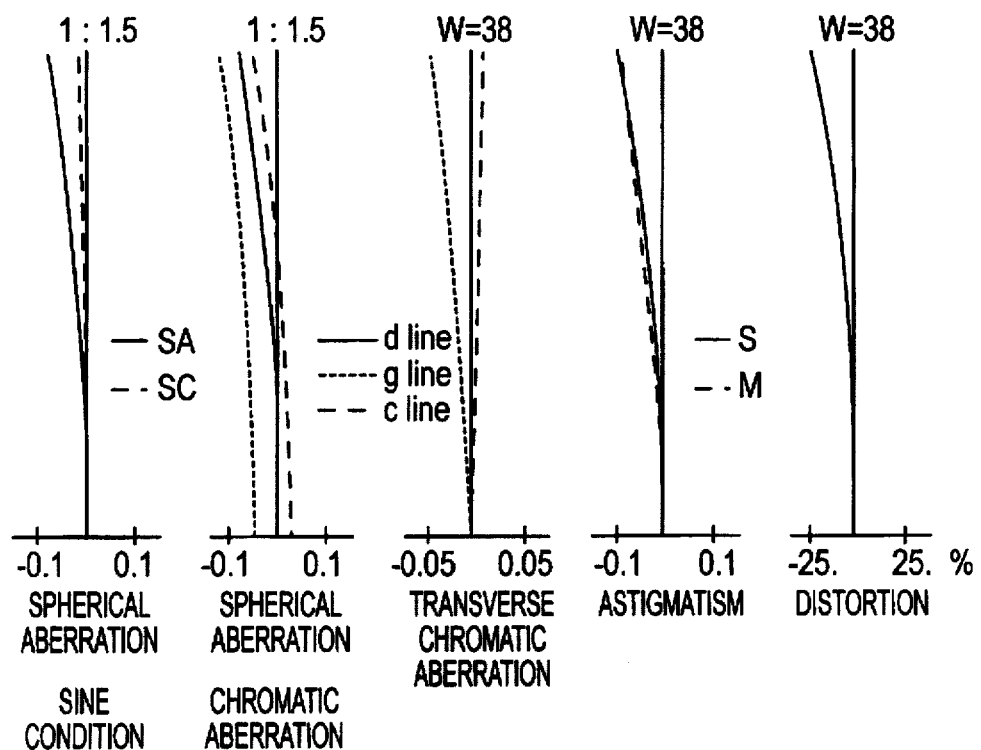
FIG. 24 shows diagrams of various aberrations of the lens system shown in FIG. 21, at a telephoto extremity; and, FIG. 25 shows the maximum height with respect to the optical axis that a bundle of light, incident at an angle of 60° on the surface nearest to the object side of the first lens group, passes through the image side of the negative meniscus lens.
Figure 25:
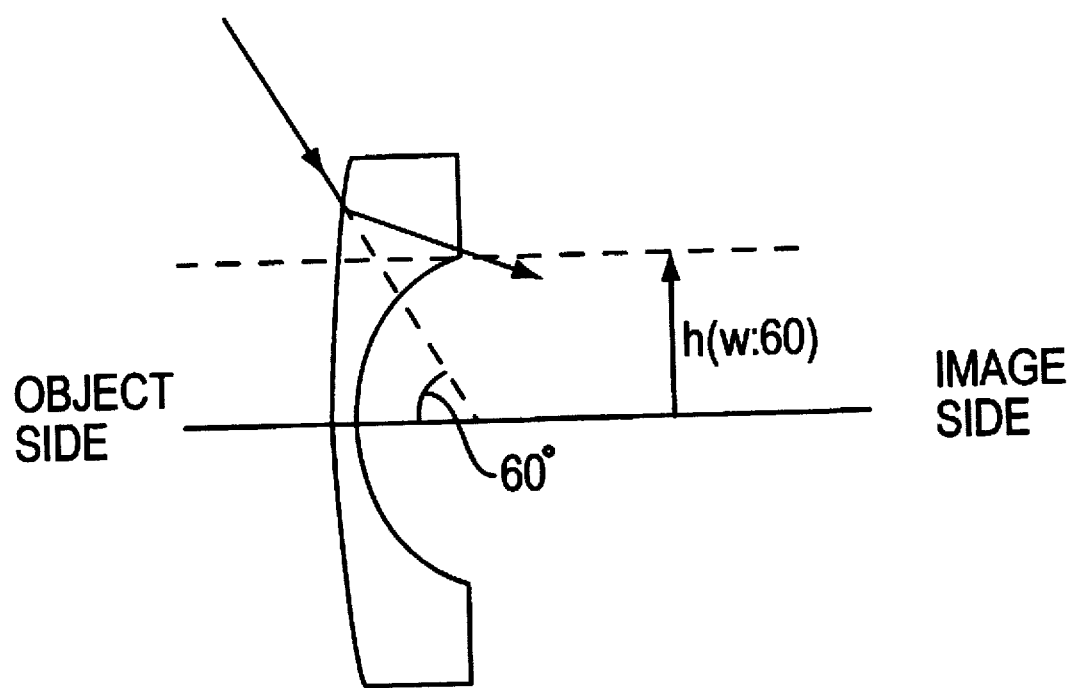

Numerical data of the lens system is shown in Table 6 below. Aberrations at the wide angle extremity, an intermediate focal length, and the telephoto extremity are shown in FIGS. 22, 23 and 24, respectively.

TABLE 6

$F_{NO} = 1.4$–$1.5$–$1.5$
$f = 3.33$–$4.50$–$5.40$
$W = 83$–$48$–$38°$

| surface No. | r | d | $N_d$ | $v_d$ |
|---|---|---|---|---|
| 1 | 337.752 | 1.10 | 1.77250 | 49.6 |
| 2 | 7.699 | 5.90 | — | — |
| 3 | −14.279 | 1.10 | 1.65830 | 57.3 |
| 4 | 24.355 | 4.19 | 1.84666 | 23.8 |
| 5 | −21.621 | 12.31–5.64–2.49 | — | — |
| 6 | −493.519 | 3.60 | 1.77250 | 49.6 |
| 7 | −9.133 | 1.00 | 1.84666 | 23.8 |
| 8 | −45.809 | 0.10 | — | — |
| 9 | 29.606 | 2.67 | 1.77250 | 49.6 |
| 10 | −29.606 | 1.00–4.81–7.74 | — | — |
| 11 | ∞ | 0.50 | 1.49831 | 65.1 |
| 12 | ∞ | 2.59 | — | — |
| 13 | −12.755 | 1.00 | 1.83400 | 37.2 |
| 14 | 14.430 | 3.41 | 1.48749 | 70.2 |
| 15 | −15.640 | 0.10 | — | — |
| 16 | 21.219 | 3.28 | 1.69680 | 55.5 |
| 17 | −22.180 | 0.10 | — | — |
| 18 | 10.278 | 2.64 | 1.77250 | 49.6 |
| 19 | −23.484 | 5.36 | — | — |
| 20 | ∞ | 3.50 | 1.49782 | 66.8 |
| 21 | ∞ | — | — | — |

$r_a = 337.752$  $r_b = 7.699$  $r_c = -14.279$
$h(w{:}80) = 6.70$  $h(w{:}70) = 6.55$  $h(w{:}60) = 6.32$
$D_W = 12.31$  $f_1 = -12.828$  $f_W = 3.33$
$ENP_{(O)} = 1.279$  $ENP_{(P)} = 7.843$

Table 7 below shows numerical values (results) of the formulae (1) through (6) in the above-mentioned embodiments.

| | Embodiment | | |
|---|---|---|---|
| | 1 | 2 | 3 |
| formula (1) | 8.28 | 9.48 | 8.615 |
| formula (2) | 0.830 | 0.840 | 0.841 |
| formula (3) | 0.842 | 0.883 | 0.771 |
| formula (4) | −60.900 | −76.625 | −118.743 |
| formula (5) | 0.814 | 0.791 | 0.790 |
| formula (2') | 0.865 | 0.870 | 0.867 |
| formula (2") | 0.886 | 0.874 | 0.874 |
| formula (6) | 0.501 | 0.490 | 0.470 |
| | 4 | 5 | 6 |
| formula (1) | 8.283 | 14.36 | 43.87 |
| formula (2) | 0.809 | 0.821 | 0.826 |
| formula (3) | 0.912 | 1.29 | 0.952 |
| formula (4) | −60.9 | −160.894 | −15.279 |
| formula (5) | 0.849 | 0.678 | 0.259 |
| formula (2') | 0.846 | 0.864 | 0.851 |
| formula (2") | 0.872 | 0.870 | 0.887 |
| formula (6) | 0.801 | 0.646 | 0.512 |

As can be seen from Table 7, the numerical values in each embodiment meet the formulae (1) through (6), as well as the formulae (2') and (2"). Note that in the sixth embodiment which is applied to the CCTV, since the focal length is short, the image size is small; further, since the lens is small, it is not necessary to meet the formula (5) which specifies the requirement for miniaturization. However, the sixth embodiment satisfies the relationship defined by all the formulae except formula (5). In the super wide angle zoom lens according to the present invention, the half angle of view exceeds 60°, and reaches 80° or more at the wide angle extremity. Namely, the angle of view reaches the coverage of a fisheye lens. It has also been experimentally confirmed that the aberrations could be well corrected in the super wide angle zoom lens according to the present invention.

As can be understood from the above discussion, according to the present invention, a simple super wide angle zoom lens whose half angle of view is more than 60° and can also reach more than 80°, which constitutes the half angle of view of a fisheye lens.

I claim:
1. A super wide angle zoom lens comprising:
    a first lens group of negative power; and
    a rear lens group of positive power, said first lens group being arranged closer to an object side than said rear lens group,
    wherein zooming is carried out by relatively moving said first lens group and said rear lens group, and
    said super wide angle zoom lens further comprising, at a wide angle extremity thereof, a half angle of view of more than 60°.
2. The super wide angle zoom lens according to claim 1, wherein said first lens group comprises a negative meniscus lens having a concave surface located on an image side, said negative meniscus lens satisfying the following relationships:

$$r_a/r_b > 5, \text{ and}$$

$$h(w:60)/r_b > 0.7,$$

wherein "$r_a$" stands for a radius of curvature of a surface of said negative meniscus lens that is located on an object side,
    "$r_b$" stands for a radius of curvature of a surface of said negative meniscus lens that is located on the image side, and
    "h(w:60)" stands for a maximum heights with respect to the optical axis of said zoom lens, where a bundle of light, incident at an angle of 60° on a lens surface nearest to the object side of said first lens group, exits the image side of said negative meniscus lens.
3. The super wide angle zoom lens according to claim 2, wherein said super wide angle zoom lens satisfies the following relationship:

$$0.6 < f_w/f_1 < 1.0,$$

wherein "$f_w$" stands for the focal length of said super wide angle zoom lens at the wide angle extremity, and
    "$f_1$" stands for a focal length of said first-lens group.
4. The super wide angle zoom lens according to claim 2, wherein the half angle of view at the wide angle extremity is more than 70° and said negative meniscus lens satisfies the following relationship:

$$h(w:70)/r_b > 0.8,$$

wherein "h(w:70)" stands for a maximum height, with respect to the optical axis of said zoom lens, where a bundle of light, incident at an angle of 70° on a lens surface nearest to the object side of said first lens group, exits the image side of said negative meniscus lens.
5. The super wide angle zoom lens according to claim 2, wherein the half angle of view at the wide angle extremity is more than 80° and said negative meniscus lens satisfies the following relationship:

$$h(w:80)/r_b > 0.85,$$

wherein "h(w:80)" stands for a maximum height, with respect to the optical axis of said zoom lens, where a bundle of light, incident at an angle of 80° on a lens surface nearest to the object side of said first lens group, exits the image side of said negative meniscus lens.
6. The super wide angle zoom lens according to claim 1, wherein said super wide angle zoom lens satisfies the following relationship:

$$0.5 < D_w/f_1 < 1.4,$$

wherein "$D_w$" stands for a spatial distance between said first lens group and said rear lens group at the wide angle extremity, and
    "$f_1$" stands for a focal length of said first lens group.
7. The super wide angle zoom lens according to claim 1, wherein said super wide angle zoom lens satisfies following relationship:

$$r_c < 0,$$

wherein "$r_c$" stands for a radius of curvature of an object-side lens surface of a lens adjacent to said negative meniscus lens.
8. The super wide angle zoom lens according to claim 1, further comprising a diaphragm which is movable together with said rear lens group, independently of said first lens group during a zooming operation.
9. A super wide angle zoom lens comprising:
    a first lens group of negative power; and
    a rear lens group of positive power, said first lens group being closer to an object side than said rear lens group,
    wherein zooming is carried out by relatively moving said first lens group and said rear lens group, and
    further wherein the position of an entrance pupil at which a bundle of light, having a maximum angle of view at a wide angle extremity, passes and the position of an entrance pupil at which paraxial light passes satisfy the following relationship:

$$(ENP_{(O)} - ENP_{(P)})/f_1 > 0.3, (f_1 < 0),$$

wherein "$ENP_{(O)}$" stands for a distance of the entrance pupil, through which light having the maximum angle of view at the wide angle extremity passes, from a first surface on the object side of said first lens group,
    "$ENP_{(P)}$" stands for a distance of the entrance pupil, through which paraxial light passes at the wide angle extremity, from the first surface on the object side of said first lens group; and
    "$f_1$" stands for a focal length of said first lens group.
10. The super wide angle zoom lens according to claim 9, wherein said super wide angle zoom lens satisfies the following relationship:

$$0.5 < D_w/f_1 < 1.4,$$

wherein "$D_w$" stands for a spatial distance between said first lens group and said rear lens group at the wide angle extremity.
11. The super wide angle zoom lens according to claim 9, wherein said super wide angle zoom lens satisfies the following relationship:

$$r_c < 0,$$

wherein "$r_c$" stands for the radius of curvature of an object side lens surface of a lens adjacent to a negative meniscus lens of said first lens group.
12. The super wide angle zoom lens according to claim 9, further comprising a diaphragm which is movable together with said rear lens group, independently of said first lens group during a zooming operation.

13. A super wide angle zoom lens comprising:

a first lens group of negative power; and a rear lens group of positive power, said first lens group being arranged closer to art object side than said rear lens group, wherein zooming is carded out by relatively moving said first lens group and said rear lens group, and said first lens group comprising a negative meniscus lens having a concave surface located on an image side, said negative meniscus lens satisfying the following relationships:

$r_a/r_b > 5$, and $h(w:60)/r_b > 0.7$, wherein "$r_a$" stands for a radius of curvature of a surface of said negative meniscus lens that is located on an object side, "$r_b$" stands for a radius of curvature of a surface of said negative meniscus lens that is located on the image side, and "h(w:60)" stands for a maximum height, with respect to the optical axis of said zoom lens where a bundle of light, incident at an angle of 60° on a lens surface nearest to the object side of said first lens group, exits the image side of said negative meniscus lens.

14. The super wide angle zoom lens according to claim 13, wherein said super wide angle zoom lens satisfies the following relationship:

$0.6 < f_w/f_1 < 1.0$, wherein "$f_w$" stands for the focal length of said super wide angle zoom lens at the wide angle extremity, and "$f_1$" stands for a focal length of said first-lens group.

15. The super wide angle zoom lens according to claim 13, wherein the half angle of view at the wide angle extremity is more than 70° and said negative meniscus lens satisfies the following relationship:

$h(w:70)/r_b > 0.8$, wherein "h(w:70)" stands for a maximum height, with respect to the optical axis of said zoom lens, where a bundle of light, incident at an angle of 70° on a lens surface nearest to the object side of said first lens group, exits the image side of said negative meniscus lens.

16. The super wide angle zoom lens according to claim 13, wherein the half angle of view at the wide angle extremity is more than 80° and said negative meniscus lens satisfies the following relationship:

$h(w:80)/r_b > 0.85$, wherein "h(w:80)" stands for a maximum height, with respect to the optical axis of said zoom lens, where a bundle of light, incident at an angle of 80° on a lens surface nearest to the object side of said first lens group, exits the image side of said negative meniscus lens.

17. The super wide angle zoom lens according to claim 13, wherein said super wide angle zoom lens further comprises, at a wide angle extremity thereof, a half angle of view of more than 60°.

* * * * *